United States Patent [19]

Nagamine et al.

[11] Patent Number: 4,732,876

[45] Date of Patent: Mar. 22, 1988

[54] OPHTHALMIC AND OPTICAL GLASS

[75] Inventors: Izumi Nagamine, Sagamihara; Nobuhiro Nozawa, Kanagawa, both of Japan

[73] Assignee: Kabushiki Kaisha Ohara, Kanagawa, Japan

[21] Appl. No.: 55,012

[22] Filed: May 28, 1987

Related U.S. Application Data

[63] Continuation-in-part of Ser. No. 843,786, Mar. 25, 1986, abandoned.

[30] Foreign Application Priority Data

Apr. 4, 1985 [JP] Japan .................................. 60-71597

[51] Int. Cl.$^4$ .......................... C03C 3/068; C03C 4/00
[52] U.S. Cl. ...................................... 501/78; 501/901; 501/903
[58] Field of Search .................... 501/78, 79, 901, 903

[56] References Cited

U.S. PATENT DOCUMENTS

| | | | |
|---|---|---|---|
| 4,057,435 | 11/1977 | Boudot et al. ..................... | 501/903 |
| 4,213,786 | 7/1980 | Faulstich et al. .................. | 501/903 |
| 4,213,787 | 7/1980 | Faulstich et al. .................. | 501/903 |
| 4,390,638 | 6/1983 | Mennemann et al. ............. | 501/903 |
| 4,612,295 | 9/1986 | Sagara ................................ | 501/901 |

*Primary Examiner*—Mark L. Bell
*Attorney, Agent, or Firm*—Ladas & Parry

[57] ABSTRACT

An Ophthalmic and optical glass which is a $B_2O_3$ - $SiO_2$ - $Li_2O$ - $CaO$ - $La_2O_3$ - $TiO_2$ - $ZrO_2$-$Nb_2O_5$ system in which relatively large amounts of $B_2O_3$ and $La_2O_3$ ingredients coexist has improved resistivity to devitrification while maintaining desirable optical constants, i.e., a refractive index ($\eta d$) in the range of 1.75 to 1.84, Abbe number ($\nu d$) in the range of 33 to 40 and specific gravity of 4.0 or less. Besides, the range of content of the $Li_2O$ ingredient which is effective for the chemical strengthening treatment can be enlarged by this system of glass.

2 Claims, No Drawings

OPHTHALMIC AND OPTICAL GLASS

This is a continuation-in-part of copending application Ser. No. 843,786 filed on Mar. 25, 1986, now abandoned.

BACKGROUND OF THE INVENTION

This invention relates to a novel ophthalmic and optical glass of a $B_2O_3$-$SiO_2$-$Li_2O$-$CaO$-$La_2O_3$-$TiO_2$-$ZrO_2$-$Nb_2O_5$ system which has wide ranges of optical constants, namely a refractive index ($\eta d$) in the range of 1.75 to 1.84, Abbe number ($\nu d$) in the range of 33 to 40 and specific gravity of 4.0 or less, and is excellent in resistivity to devitrification and is capable of being imparted with a high impact resisting property in a chemical aftertreatment.

For an ophthalmic lens, a lens of a refractive index ($\eta d$) of about 1.52 has often been used. It is disadvantageous, however, to produce a lens of a high positive or negative diopter value by using a lens of such a low refractive index, for the peripheral or central portion of the lens becomes thick and therefore the weight of the lens increases and, in addition, chromatic aberration in the peripheral portion increases thereby causing occurrence of a rainbow with resulting disadvantages for the user of the ophthalmic lens both in use and appearance.

For eliminating such disadvantages, proposals have been made for providing a glass of a high refractivity and low specific gravity and various ophthalmic glasses having a high refractive index $\eta d \geq$ about 1.75 have become known. For example, U.S. Pat. No. 4,213,786 discloses a glass of $SiO_2$-$B_2O_3$-$CaO$-$Sro$-$TiO_2$-$La_2O_3$ system. This glass, however, has the disadvantage that it tends to become tinted. The U.S. Pat. No. 4,612,295 discloses a $SiO_2/B_2O_3$-$CaO$-$Nb_2O_5$ system glass in which the $SiO_2$ ingredient should be comprised as a main ingredient in the principal ingredients of $SiO_2$ and $B_2O_3$. This glass, however, is not suitable for mass production because it has only poor resistivity to devitrification. Besides, it is difficult to impart an impact resisting property to ophthalmic glasses produced from these glasses by a chemical strengthening aftertreatment and hence safety in using these ophthalmic glasses is not ensured. U.S. Pat. No. 4,213,787 discloses a $SiO_2$-$Li_2O$-$BaO$-$TiO_2$-$ZrO_2$-$Nb_2O_5$ system glass which is capable of being imparted with an impact resisting property by a chemical strengthening treatment while it maintains a high refractivity and low specific gravity. This glass, however, is not sufficient in its $\nu d$ value and hence occurrence of a rainbow is not eliminated if this glass is used for an ophthalmic lens of a high diopter value. Besides, the ranges of the optical constants are so narrow that freedom in selecting optical constants is limited and it is difficult to obtain the long desired optical glass of a light weight and a high refractivity over wide ranges of optical constants.

In the U.S. Pat. No. 4,057,435, a glass of a $B_2O_3$-$SiO_2$-$CaO$-$La_2O_3$-$TiO_2$ system has been proposed. It is, however, difficult to obtain a high refractivity of 1.75 or over in this glass. Besides, this glass is insufficient in chemical durability.

It is therefore an object of the present invention to comprehensively eliminate the above described disadventages of the prior art ophthalmic glasses and provide a novel ophthalmic and optical glass which has relatively wide ranges of optical constants, namely a refractive index ($\eta d$) within the range of 1.75 to 1.84, Abbe number ($\nu d$) within the range of 33 to 40 and specific gravity of 4.0 or less, and which is excellent in resistivity to devitrification and tinting and in chemical durability and is capable, if necessary, of being imparted with an impact resisting property by a chemical strengthening treatment.

SUMMARY OF THE INVENTION

Accumulated studies and experiments made by the inventors of the present invention in an attempt to achieve the above described object have resulted in findings, which has led to the present invention, that resistivity to devitrification and tinting and chemical durability can be remarkably improved while maintaining desired optical constants and low specific gravity by a glass of a $B_2O_3$-$SiO_2$-$Li_2O$-$CaO$-$La_2O_3$-$TiO_2$-$ZrO_2$-$Nb_2O_5$ system in which relatively large amounts of $B_2O_3$ and $La_2O_3$ ingredients coexist and that the range of content of the $Li_2O$ ingredient which is effective for the chemical strengthening process can be enlarged by this system of glass.

The ophthalmic and optical glass achieving the above described object of the invention is characterized in that the glass consists essentially of the following ingredients in weight percent:

| | |
|---|---|
| $B_2O_3$ | 21.5–26% |
| $SiO_2$ | 1–14% |
| in Which $B_2O_3$ + $SiO_2$ | 25–40% |
| $Li_2O$ | 3.5–12% |
| $Na_2O$ | 0–5% |
| $K_2O$ | 0–5% |
| $MgO$ | 0–10% |
| $CaO$ | 6–17% |
| $SrO$ | 0–10% |
| $BaO$ | 0–10% |
| $ZnO$ | 0–10% |
| in Which $MgO$ + $CaO$ + $SrO$ + $BaO$ + $ZnO$ | 6–17.5% |
| $La_2O_3$ | 18–40% |
| $Gd_2O_3$ | 0–15% |
| $Y_2O_3$ | 0–15% |
| $TiO_2$ | 4–13% |
| $ZrO_2$ | 1–10% |
| $Nb_2O_5$ | 1–30% |
| $Al_2O_3$ | 0–5% |
| $As_2O_3$ | 0–1% |
| and $Sb_2O_3$ | 0–1% |

DETAILED DESCRIPTION OF THE INVENTION

In the ophthalmic and optical glass made according to the invention, the above described content ranges of the respective ingredients have been selected for reasons stated below.

In the glass of the present invention, $B_2O_3$ is an important ingredient which enables coexisting introduction of both a relatively large amount of $La_2O_3$ ingredient which imparts the glass with a high refractivity and a relatively wide range of $Li_2O$ ingredient which is effective in chemical strengthening, while maintaining excellent resistivity to devitrification. If, however, the amount of $B_2O_3$ is less than 21.5%, the above described effect is not obtained to an appreciable extent whereas if the amount exceeds 26%, chemical durability of the glass tends to deteriorate. No less than 1% of $SiO_2$ ingredient is required for maintaining resistivity to devitrification, chemical durability and optimum viscosity in forming of glass. If the $SiO_2$ content exceeds 14%, melting property of the glass tends to decrease. If the total amount of the $B_2O_3$ and $SiO_2$ ingredients is less than 25%, the tendency to devitrification increases whereas if this total amount exceeds 40%, the desired refractivity can hardly be obtained. The $Li_2O$ ingredient is important in that it imparts the glass with higher refractivity than the other alkaline metal oxide ingredients and that it works as an effective ingredient in chemical strengthening. If its content is too small, these effects cannot be obtained whereas if its content is too large, devitrification takes place. Its content, therefore, should be within the range of between 3.5–12%, preferably within the range of between 4–10%. The CaO ingredient is effective for decreasing specific gravity of the glass and for this purpose no less than 6% CaO should be contained. For preventing the tendency to devitrification, the CaO content should not exceed 17%.

The $La_2O_3$ ingredient is an important ingredient because it imparts the glass with high refractive-low dispersion characteristics. If its content is less than 18%, the desired effect cannot be sufficiently obtained. For preventing the specific gravity of the glass from becoming an excessively large value, the $La_2O_3$ content should not exceed 40%, preferably 35%. The $TiO_2$ ingredient is effective for increasing refractivity and reducing specific gravity of the glass. If its content is less than 4%, this effect cannot be obtained to an appreciable extent whereas if its content exceeds 13%, resistivity to devitrification and tinting tend to deteriorate.

The $ZrO_2$ ingredient increases refractivity and chemical durability of the glass. If the $ZrO_2$ content is less than 1%, these effects cannot be obtained whereas if the content exceeds 10%, the melting property of the glass decreases. For maintaining the desired refractivity and resistivity to devitrification without excessively increasing specific gravity, at least 1%, preferably 6% or more, of the $Nb_2O_5$ ingredient is necessary. The upper limit of its content should be 30%, preferably 27%, for preventing the $\nu d$ value from becoming too small.

The ingredients described below may be added to the glass in suitable amounts according to necessity for controlling the optical constants and also for improving resistivity to devitrification, chemical durability and melting property of the glass. For improving the melting property of the glass, the $Na_2O$ and $K_2O$ ingredients may be added up to 5% respectively within a range in which the desired refractivity can be maintained. The MgO, SrO, BaO and ZnO ingredients may be added for controlling the optical constants within a range in which resistivity to devitrification and chemical durability do not deteriorate, i.e., up to 10% respectively. However, the total amount of one or more ingredients of these divalent metal oxides and the CaO ingredient should not exceed 17.5% for maintaining resistivity to devitrification. The $Y_2O_3$ and $Gd_2O_3$ ingredients may be added for controlling the optical constants and improving resistivity to devitrification but the contents of these ingredients should not exceed 15% respectively from the standpoint of costs of the raw materials. The $Al_2O_3$ ingredient is effective for improving chemical durability and may be added up to 5% within a range in which the desired refractivity can be maintained. The $As_2O_3$ and $Sb_2O_3$ ingredients may be added up to about 1% respectively as a refining agent in melting of the glass.

According to necessity, the PbO, $Ta_2O_5$, $WO_3$ and $Bi_2O_3$ ingredients may be added up to 5% respectively. A small amount of a known oxide or sulphide of Fe, Ni, Cr, Co, Mn, Cu, Nd, Pr or Se may be added as a colorant.

In the chemical treatment of the glass of the invention for imparting it with the impact resisting property, a known molten salt of sodium and/or potassium may be used.

EXAMPLES

The following Table 1 shows results of various tests conducted on an example (No. 1) of the glass according to the invention, a comparative example (No. I) of the above described $SiO_2$-$B_2O_3$-CaO-SrO-$TiO_2$-$La_2O_3$ system glass (The U.S. Pat. No. 4,213,786) which resembles this example and a comparative example (No. II) of a glass which is outside of the range of composition of this system by merely having a decreased content of $TiO_2$ for improving tendency to tinting.

Table 1 shows also another example (No. 2) of the glass according to the invention and a comparative example (No. III) of the above described $B_2O_3$-$SiO_2$-CaO-$La_2O_3$-$TiO_2$ system glass (The U.S. Pat. No. 4,057,435) which resembles this example.

The devitrification test (D.T) was conducted by placing a previously prepared batch of raw materials in a platinum crucible of 300 cc, melting the batch for two hours at 1350°–1400° C., thereafter lowering the temperature to hold the glass specimen in other furnaces kept at 1000° C. and 900° C. successively for 20 minutes in each of these furnaces, and observing the glass specimen in the crucible. In the table, glasses which were clear and free from devitrification are indicated by a circle and ones which were opaque and devitrified are indicated by a cross. For conducting the impact resistance test(B.T), test specimens were prepared by melting raw materials in a platinum crucible of 3 liters, stirring and homogenizing the melt and thereafter forming it into glass disc specimens of 50 mm$\phi \times$2.0 mmt and subjecting these glass disc specimens to chemical strengthening by soaking them in a molten nitrate of potassium which is held at a temperature lower than the transition temperature of this glass by 75° C. The impact resistance test was conducted for thirty pieces of these glass specimens prepared in the above described manner for each of the glasses to be tested by dropping a steel ball of 16.2 gr from the height of 183 cm on the horizontal surface of each of these glass specimens and measuring the rate of broken specimens. In the table, glasses for which the rate of broken specimens is within 10% are indicated by a circle.

Data of degree of tinting are wavelengths at which spectral transmittance is 80%, which spectral transmittance being measured on a specimen which has been ground in opposite surfaces to 10 mm. Data of acid resisting property are length of time which elapses from soaking a glaus specimen with a new ground surface into 1 N nitric acid aqueous solution at 25° C. until a violet interference color appears on the ground surface of the glass.

TABLE 1

|  | Examples | Comparative examples |  | Example | (weight %) Comparative example |
|---|---|---|---|---|---|
| No. | 1 | I | II | 2 | III |
| $SiO_2$ | 13.5 | 15.0 | 19.0 | 14.0 | 12.0 |
| $B_2O_3$ | 21.5 | 20.0 | 12.0 | 26.0 | 30.0 |
| $Li_2O$ | 4.0 | 5.0 | 4.0 | 4.0 | 4.0 |
| MgO | 0.5 | 3.0 |  |  |  |

TABLE 1-continued

|  | Examples | Comparative examples |  | Example | (weight %) Comparative example |
|---|---|---|---|---|---|
| No. | 1 | I | II | 2 | III |
| CaO | 12.0 | 12.0 | 14.0 | 17.0 | 18.0 |
| SrO | 5.0 | 5.0 | 8.0 |  |  |
| BaO |  |  | 2.0 | 0.5 | 2.0 |
| $La_2O_3$ | 21.5 | 17.0 | 26.0 | 18.0 | 15.0 |
| $TiO_2$ | 13.0 | 15.0 | 13.0 | 13.0 | 13.0 |
| $ZrO_2$ | 3.0 | 3.0 |  | 2.5 | 1.0 |
| $Nb_2O_5$ | 6.0 | 5.0 | 2.0 | 5.0 | 5.0 |
| $\eta d$ | 1.7766 | 1.7704 | — | 1.7549 | 1.7390 |
| $\nu d$ | 36.0 | 35.4 | — | 37.7 | 38.3 |
| specific gravity | 3.52 | 3.41 | — | 3.32 | 3.25 |
| D.T | o | o | x | o | o |
| B.T | o | o | — | o | o |
| degree of tinting(nm) | 417 | 430 | — | 420 | 420 |
| acid resisting property(min.) | 40 | 40 | — | 30 | 10 |

As shown in Table 1, the glass of Example No. 1 of the invention is superior in resistivity to tinting to the glass of Comparative example No. I and the difference between the two glasses can be clearly observed with the naked eye. As compared with the glass of Comparative example No. II, the glass of Example No. 1 is superior in resistivity to devitrification. Further, the glass of Example No. 2 of tha invention is remarkably improved in acid resisting property as conpared with the glass of Comparative example No. III.

Table 2 shows other examples (No.3–No. 15) of the glass according to the invention and comparative examples (No. IV and No. V) of the above described $SiO_2$-$B_2O_3$-CaO-$Nb_2O_5$ system glass (The U.S. Pat. No. 4,612,295) and $SiO_2$-$Li_2O$-BaO-$TiO_2$-$ZrO_2$-$Nb_2O_5$ system glass (The U.S. Pat. No. 4,213,787) with results of various tests conducted on these examples and comparative examples.

As shown in Table 2, the glass of the comparative example IV, is so inferior in resistivity to devitrification that the test specimen for the impact resistance test could not be prepared (the figure in the parenthesis i; one of a quenched specimen). The glass of the comparative example V is of such a small $\nu d$ value that occurrence of a rainbow due to chromatic aberration cannot be eliminated if this glass is used for the ophthalmic glass. In contrast thereto, the glasses of the examples (No. 3–No.15) of the present invention are excellent in the vd value and resistivity to devitrification and impact resisting property, while maintaining the desired high refractivity and low specific gravity whereby the defects of the glasses of the comparative examples are comprehensively eliminated.

Although not shown in Table 2, the glasses of these examples have, as has the glass of the example shown in Table 1, excellent resistivity to tinting and acid resisting property.

|  | Examples (weight %) | | | | | | | |
|---|---|---|---|---|---|---|---|---|
| No | 3 | 4 | 5 | 6 | 7 | 8 | 9 | 10 |
| $SiO_2$ | 2.0 | 7.0 | 8.0 | 13.5 | 2.0 | 2.0 | 12.0 | 12.0 |
| $B_2O_3$ | 26.0 | 24.0 | 25.0 | 24.0 | 23.5 | 25.0 | 26.0 | 22.0 |
| $Al_2O_3$ |  |  |  |  | 2.5 | 3.0 |  |  |
| $Li_2O$ | 7.0 | 5.0 | 7.5 | 4.5 | 8.0 | 4.0 | 5.5 | 6.5 |
| $Na_2O$ |  |  |  |  |  |  |  |  |
| $K_2O$ |  |  | 0.5 |  |  | 3.0 | 2.0 |  |
| MgO |  |  | 4.0 |  |  |  |  |  |
| CaO | 13.0 | 15.0 | 9.0 | 6.0 | 10.0 | 17.0 | 8.0 | 11.0 |
| SrO |  |  |  |  |  |  |  |  |
| BaO |  |  |  |  |  |  |  |  |
| ZnO |  |  |  |  | 0.5 |  |  |  |
| $La_2O_3$ | 20.0 | 21.0 | 19.5 | 24.0 | 19.0 | 18.5 | 20.0 | 29.0 |
| $Y_2O_3$ |  |  |  |  | 5.0 |  |  |  |
| $Gd_2O_3$ |  |  | 0.5 |  |  |  | 4.0 |  |
| $TiO_2$ | 8.0 | 13.0 | 12.0 | 4.0 | 12.0 | 11.5 | 13.0 | 7.0 |
| $ZrO_2$ | 7.0 | 7.0 | 8.0 | 1.0 | 7.0 | 4.0 | 2.0 | 4.5 |
| $Nb_2O_5$ | 17.0 | 8.0 | 6.0 | 23.0 | 10.0 | 11.5 | 7.5 | 8.0 |
| $As_2O_3$ |  |  |  |  |  | 0.5 |  |  |
| $Sb_2O_3$ |  |  |  |  | 0.5 |  |  |  |
| $\eta d$ | 1.8151 | 1.8020 | 1.7685 | 1.7989 | 1.8067 | 1.7750 | 1.7639 | 1.7623 |
| $\nu d$ | 34.9 | 34.4 | 35.6 | 34.6 | 34.4 | 34.9 | 36.1 | 37.9 |
| specific gravity | 3.59 | 3.56 | 3.43 | 3.55 | 3.58 | 3.57 | 3.38 | 3.58 |
| D.T | o | o | o | o | o | o | o | o |
| B.T | o | o | o | o | o | o | o | o |

|  | Examples | | | | | Comparative examples | |
|---|---|---|---|---|---|---|---|
| No | 11 | 12 | 13 | 14 | 15 | IV | V |
| $SiO_2$ | 13.0 | 12.0 | 4.0 | 7.0 | 3.0 | 30.1 | 28.40 |
| $B_2O_3$ | 23.0 | 25.0 | 26.0 | 25.0 | 23.0 |  | 3.20 |
| $Al_2O_3$ |  |  |  |  |  |  |  |
| $Li_2O$ | 6.0 | 7.0 | 10.0 | 4.0 | 5.0 | 4.0 | 6.35 |
| $Na_2O$ |  | 1.0 |  |  |  |  | 1.10 |
| $K_2O$ |  |  |  |  |  |  |  |
| MgO |  |  |  |  |  |  |  |
| CaO | 6.0 | 7.0 | 16.0 | 10.0 | 15.0 | 25.5 |  |
| SrO |  |  |  | 3.0 |  |  | 6.50 |
| BaO |  |  |  |  |  |  | 10.80 |
| ZnO | 6.0 |  |  |  |  |  |  |
| $La_2O_3$ | 25.5 | 31.0 | 19.0 | 23.0 | 20.0 | 3.6 | 3.2 |

-continued

| | | | | | | | (weight %) |
|---|---|---|---|---|---|---|---|
| Y₂O₃ | | | | | | 4.0 | |
| Gd₂O₃ | | | | | | | |
| TiO₂ | 13.0 | 7.0 | 9.0 | 12.0 | 12.0 | 10.5 | 12.30 |
| ZrO₂ | 1.5 | 3.0 | 10.0 | 6.0 | 7.0 | 9.8 | 6.25 |
| Nb₂O₅ | 6.0 | 7.0 | 6.0 | 10.0 | 11.0 | 16.5 | 21.70 |
| As₂O₃ | | | | | | | 0.20 |
| Sb₂O₃ | | | | | | | |
| $\eta$d | 1.7771 | 1.7515 | 1.7831 | 1.8043 | 1.8338 | (1.800) | 1.8010 |
| $\nu$d | 34.4 | 38.4 | 36.6 | 34.7 | 34.9 | (33.8) | 30.0 |
| specific gravity | 3.40 | 3.57 | 3.51 | 3.59 | 3.71 | (3.42) | 3.54 |
| D.T | o | o | o | o | o | x | o |
| B.T | o | o | o | o | o | | o |

The glasses of the examples of the invention can be easily produced by melting mixture of raw materials including, for example, nitrates, carbonates, oxides and various metals at the temperature of about 1300°–1400° C. in a melting apparatus such as a platinum crucible, stirring the mixture to homogenize it, lowering the temperature and casting or pressing the melt and thereafter annealing it.

As described above, since the ophthalmic and optical glass according to the invention is a $B_2O_3$-$SiO_2$-$Li_2O$-$CaO$-$La_2O_3$-$TiO_2$-$ZrO_2$-$Nb_2O_5$ system glass of a specific composition range in which relatively large amounts of $B_2O_3$ and $La_2O_3$ ingredients coexist and the $Li_2O$ ingredient over a wide content range can be included, the glass has high refractive-low dispersion characteristics, low specific gravity, excellent resistivities to devitrification and tinting and chemical durability and can be added with an excellent chemical strengthening characteristic if desired whereby the defects of the prior art glasses can be comprehensively eliminated. Moreover, since the glass according to the invention has widened selection ranges of optical constants as compared to the prior art high refractive glasses capable of being chemically strengthened, the glass according to the invention can be applied not only to the use as the ophthalmic glass but to various uses as a high refractive-low dispersion-light weight optical glass.

What is claimed is:

1. An ophthalmic and optical glass having a refractive index ($\eta$d) in the range of 1.75 to 1.84, Abbe number ($\nu$d) in the range of 33 to 40 and specific gravity of 4.0 or less, said glass consisting essentially of the following ingredients in weight percent:

| | |
|---|---|
| $B_2O_3$ | 21.5–26% |
| $SiO_2$ | 1–14% |
| in which $B_2O_3$ + $SiO_2$ | 25–40% |
| $Li_2O$ | 3.5–12% |
| $Na_2O$ | 0–5% |
| $K_2O$ | 0–5% |
| MgO | 0–10% |
| CaO | 6–17% |
| SrO | 0–10% |
| BaO | 0–10% |
| ZnO | 0–10% |
| in which MgO + CaO + SrO + BaO + ZnO | 6–17.5% |
| $La_2O_3$ | 18–40% |
| $Gd_2O_3$ | 0–15% |
| $Y_2O_3$ | 0–15% |
| $TiO_2$ | 4–13% |
| $ZrO_2$ | 1–10% |
| $Nb_2O_5$ | 1–30% |
| $Al_2O_3$ | 0–5% |
| $As_2O_3$ | 0–1% |
| and $Sb_2O_3$ | 0–1% |

2. An ophthalmic and optical glass as defined in claim 1 comprising the following ingredients in weight percent:

| | |
|---|---|
| $La_2O_3$ | 18–35% |
| and $Nb_2O_5$ | 6–27% |

* * * * *